US008483743B2

(12) United States Patent
Dimou

(10) Patent No.: US 8,483,743 B2
(45) Date of Patent: Jul. 9, 2013

(54) NEIGHBORING CELL INTERFERENCE MANAGEMENT IN SC-FDMA

(75) Inventor: Konstantinos Dimou, Langen (DE)

(73) Assignee: Panasonic Corporation, Osaka (JP)

( * ) Notice: Subject to any disclaimer, the term of this patent is extended or adjusted under 35 U.S.C. 154(b) by 938 days.

(21) Appl. No.: 12/282,102

(22) PCT Filed: Feb. 6, 2007

(86) PCT No.: PCT/EP2007/001006
§ 371 (c)(1),
(2), (4) Date: Dec. 12, 2008

(87) PCT Pub. No.: WO2007/107207
PCT Pub. Date: Sep. 27, 2007

(65) Prior Publication Data
US 2009/0131057 A1 May 21, 2009

(30) Foreign Application Priority Data

Mar. 22, 2006 (EP) .................................... 06005901

(51) Int. Cl.
*H04B 7/00* (2006.01)
(52) U.S. Cl.
USPC ........ 455/524; 455/422.1; 455/436; 455/438; 370/330; 370/344; 370/319
(58) Field of Classification Search
USPC .................. 455/466, 92, 67.1, 310, 403, 419, 455/422.1, 429, 432.1, 436–445, 461, 522, 455/524, 560, 561, 67.11, 67.13; 370/328–338, 370/344, 319
See application file for complete search history.

(56) References Cited

U.S. PATENT DOCUMENTS

| 7,054,635 | B1 * | 5/2006 | Ritzen et al. ................... 455/444 |
| 7,373,151 | B1 * | 5/2008 | Ahmed ........................ 455/452.2 |
| 7,639,660 | B2 * | 12/2009 | Kim et al. ...................... 370/343 |
| 2002/0009070 | A1 * | 1/2002 | Lindsay et al. ................ 370/347 |
| 2004/0097238 | A1 | 5/2004 | Hwang |
| 2005/0220052 | A1 * | 10/2005 | Uehara et al. ................. 370/331 |
| 2007/0173259 | A1 * | 7/2007 | Akihara ........................ 455/446 |
| 2007/0298728 | A1 | 12/2007 | Imamura |

FOREIGN PATENT DOCUMENTS

| EP | 1 126 735 | | 8/2001 |
| GB | A-1 126 735 | * | 2/2000 |
| JP | 2004-159345 | | 6/2004 |

(Continued)

OTHER PUBLICATIONS

Huawei, Ritt, Some Clarifications of Soft Frequency Reuse Scheme, R1-060545, Feb. 13, 2006-Feb. 17, 2006, XP002385701, Denver, USA.*

(Continued)

*Primary Examiner* — Kamran Afshar
*Assistant Examiner* — Marisol Fahnert
(74) *Attorney, Agent, or Firm* — Dickinson Wright PLLC

(57) ABSTRACT

The invention relates to a method for reconfiguring zones of a cell sector in a cellular mobile communication system employing a frequency division multiplex access scheme comprising the steps of separating a cell sector into zones of a predetermined size, allocating radio resources to users located in the zones, and altering the predetermined zone size upon a change of a radio resource management parameter. The invention also relates to a base station of a cellular mobile communication system.

10 Claims, 5 Drawing Sheets

FOREIGN PATENT DOCUMENTS

| JP | 2006-042381 | 2/2006 |
|---|---|---|
| WO | 2005/043948 | 5/2005 |
| WO | 2006/028204 | 3/2006 |

OTHER PUBLICATIONS

European Search Report dated Oct. 25, 2010.
3GPP TSG RAN WG3, "Handling of RRM in a Decentralised RAN Architecture," Alcatel, R3-060029, Jan. 2006, pp. 1-10.
International Search Report dated Jun. 12, 2007.
3GPP TSG RAN WG1 Meeting #44, [Online] No. R1-060545,R. Huawei, "Some Clarifications on Soft Frequency Reuse Scheme," Feb. 13, 2006, Feb. 17, 2006.
3GPP TSG RAN WG1 #44, [Online] No. R1-060667,Alcatel: "Interference Coordination for E-UTRA Uplink," Feb. 13, 2006,-Feb. 17, 2006.
3GPP TSG RAN WG1 #44, [Online] No. R1-060670,Siemens: "Interference Mitigation by Partial Frequency Reuse," Feb. 13, 2006,-Feb. 17, 2006.
3GPP TSG RAN WG1 #44, [Online] No. R1-060401,Motorola: "Interference Mitigation via Power Control and FDM Resource Allocation and UE Alignment for E-UTRA Uplink and TP," Feb. 13, 2006,-Feb. 17, 2006.
3GPP TSG RAN WG1 #42, [Online] No. R1-050833,LG Electronics: "Interference mitigation in evolved UTRA/UTRAN," Aug. 29, 2005,-Sep. 9, 2005.
3GPP TSG RAN WG1 #44, [Online] No. R1-060517, Catt: "Further Analysis of the Performance of Inter-Cell Interference Mitigation with Beam-Forming," Feb. 13, 2006,-Feb. 17, 2006.
3GPP, TSG-RAN WG1 #44, R1-060711, "Text proposal for TR25. 814, Section 9.1.2.7," Feb. 13-17, 2006, pp. 1-2, p. 2, Line 14.
H. Holma, et al., "WCDMA for UMTS," Radio Resource Management, Wiley Editions, Third Edition, 2003, pp. 226-240, p. 6, Line 5.
K. Dimou, et al., "Performance of Uplink Packet Services in WCDMA," Proceedings of the 57th IEEE Conference on Vehicular Technology, VTC Spring 2003, Apr. 2003, vol. 3, pp. 2071-2075.
K. Dimou, et al., "Scheduling Issues for Uplink Transmission in WCDMA Units," Proceedings of 4th Symposium on Wireless Personal Multimedia Communications, WPMC'01, Sep. 2001, vol. 2, pp. 991-995.
K. Dimou, et al., "Transport Format Combination Selection Procedure in Uplink in MAC UMTS: Algorithms and Performance", Proceedings of International Conference on Third Generation and Beyond, 3G Wireless, May 2001, pp. 859-864.
K. Dimou, et al., "MAC Scheduling for Uplink Transmission in UMTS WCDMA", Proceedings of 53rd IEEE Conference on Vehicular Technology, VTC Spring 2001, May 2001, vol. 4, pp. 2625-2629.
K. Dimou, et al., "Decentralized Uplink Packet Data Transmission in WCDMA Based Systems", Proceedings of IST Mobile and Wireless Telecommunications Summit, May 2002, vol. 1, pp. 719-723.
Notice of Reasons for Rejection dated Nov. 20, 2012, with English translation.

* cited by examiner

NEIGHBORING CELL INTERFERENCE MANAGEMENT IN SC-FDMA

The present invention relates to a method for reconfiguring zones in a cell sector of a cellular mobile communication system employing a frequency division multiplex access scheme, preferably single carrier FDMA.

Neighboring cell interference management in cellular systems is a widely known issue and a popular research topic over the last years. This problem arises in any kind of cellular system, but it is more accentuated in systems based in frequency division multiple access (FDMA) schemes. The solution that is given to the problem to the first widely spread FDM-based system, which is the GSM, is the partitioning of frequency bands among the different cells of the system. As a result within a given cell, only a number of the total number of available frequencies can be used. This results in a so-called frequency reuse factor bigger than 1 and consequently not all the gamut of frequency bands that are available in the system is utilized. In CDMA based systems this problem is not of such a significant importance, due to the nature of the system where all users transmit at the same bandwidth and hence at the receiver there is already a considerable amount of interference from users both in the same cell and in neighboring cells. In the latest evolution of UTRA that is based on the OFDM technology and its flavors (e.g. single carrier FDMA), there is a need for tackling this issue.

In the context of the 3GPP standardization of the evolved UTRA air interface, the Single Carrier FDMA access mode is proposed for the uplink direction of transmission. In order to avoid neighboring cell interference in such systems, there is a need of coordination of the frequencies to be allocated at adjacent cells. In these systems, interference is generated from users at adjacent cells, namely from users at the borders of the neighbor cells that transmit with high transmission power. Thus, there is a high possibility that these users transmit their signals to adjacent base stations (Node Bs) and create interference.

FIG. 1 illustrates such a system where interference management techniques rely on the separation of the frequency bands to be used within each sector. For instance, as illustrated, it is assumed that a single cell is divided into 3 sectors. Each cell contains one base station (Node B) site with three directional transmitter antennas, with the beam of the antennas pointing to the centre of each sector. The drawback of these interference management techniques is that the so-called frequency reuse factor is higher than 1. This means that within a given cell, not all of the available frequency bands are utilized.

FIG. 2 illustrates neighboring interference in a cellular system based on the SC-FDMA technology. When the User Equipments (UEs) at the cell edges are allocated the same frequency bands (or sub-carriers), there is a probability of high neighboring cell interference.

In the context of the of the SC-FDMA air interface standardization within 3GPP, these interference coordination techniques have gone further. For instance, one proposal is the separation of each sector into a number N of zones. Within each zone a number of frequency bands are allocated. Hence, User Equipments, referred to as UEs, located within a given zone, can only get resources, i.e. frequency bands that are allocated to this zone (see for instance R1-060711, "Text proposal for TR25.814, Section 9.1.2.7", Ericsson, February 2006, Denver, USA, 3GPP RAN1). As a result, all frequency bands available in the system are used at each sector of the system, i.e., the frequency reuse factor is equal to 1. Consequently, all frequency bands that are available in the system are fully utilized.

Several criteria for the definition of zones might be used. One of them is the average path loss which defines the borders of the zones. In this respect, some contributions within 3GPP have been describing such schemes. The aim of these contributions is to separate the frequencies that the UEs at zones close to the Node B ("inner" zone) are using, from the ones that are used by the UEs at cell edges. Some contributions suggest that this zone separation is fixed, or almost fixed, hence not changing. What is not described in these contributions is how these zones can be reconfigured in response of variations in system performance parameters. Moreover, these contributions do not define which are the parameters that are to be exchanged between Node Bs and the radio resource manager for reconfiguring the zones and allocating the frequency bands therein.

Therefore, the object of the present invention is to provide an effective countermeasure to neighboring cell interference in a cellular mobile communication system.

This object is solved by a method and base station as defined by the subject matters of the independent claims.

Underlying the present invention is the observation that the scaling of sectors into the zones is conventionally performed in a static or at least semi-static manner, i.e. does not variably change depending on system parameters. The method according to the present invention provides the advantage that the zone size may be reconfigured on the basis of a radio resource management parameter, for instance, that a hysteresis value used for handover decisions. Consequently, an alteration of the zone size provides the benefit of reducing the interference and at the same time allows enhancing the system capacity and smoothens the load peaks imposed on individual cells.

Such parameter may preferably be periodically updated by a radio resource manager, for instance, the hysteresis value used for handover decisions is updated when the load of certain cells of the communication system is changing. Hence, updating the zone size upon a change of a radio resource management parameter can be seen as adapting the interference coordination technique to variations in the system.

According to a preferred embodiment, the radio resource parameter is dynamically updated by a radio resource manager, who is in charge of allocating radio resources. Thus, radio resources can be distributed more efficiently and in a balanced manner depending on actual traffic conditions or cell load.

According to a further preferred embodiment, the radio resource management parameter is made dependent on the path loss. In this manner, the zone size has a proportional relationship to the path loss due to fading and interference caused by other users. Due to the proportionality between the size of the inner zone and an offset value, the interference of users to the neighboring cells can be effectively reduced.

According to a preferred embodiment, a sector is separated into an inner zone and at least two outer zones located at the cell edges and the size of the inner zone is determined by a relationship between the maximum path loss of the cell being a network planning parameter and an offset value.

In a particular advantageous embodiment, the offset value is made proportional to a value used for handover decisions for a user to handover from one cell to another cell. Accordingly, a safety margin is provided even in handover situations, thereby effectively reducing interference to neighboring cells.

According to another preferred embodiment, the offset value is dynamically updated by the radio resource manager due to variations of traffic or cell load. Hence, the offset value and consequently the size of the inner zone of each sector can be tailored to the actual traffic or load of a cell.

According to a further advantageous embodiment, the average path loss for all active users in a cell is obtained and taken as a parameter for adjustment of the zone size. In this embodiment, the interference of all users is taken into account and the system performance is consequently improved.

The invention will be better appreciated from the following detailed description of the invention with reference to the accompanying drawings in which.

Figure 1:
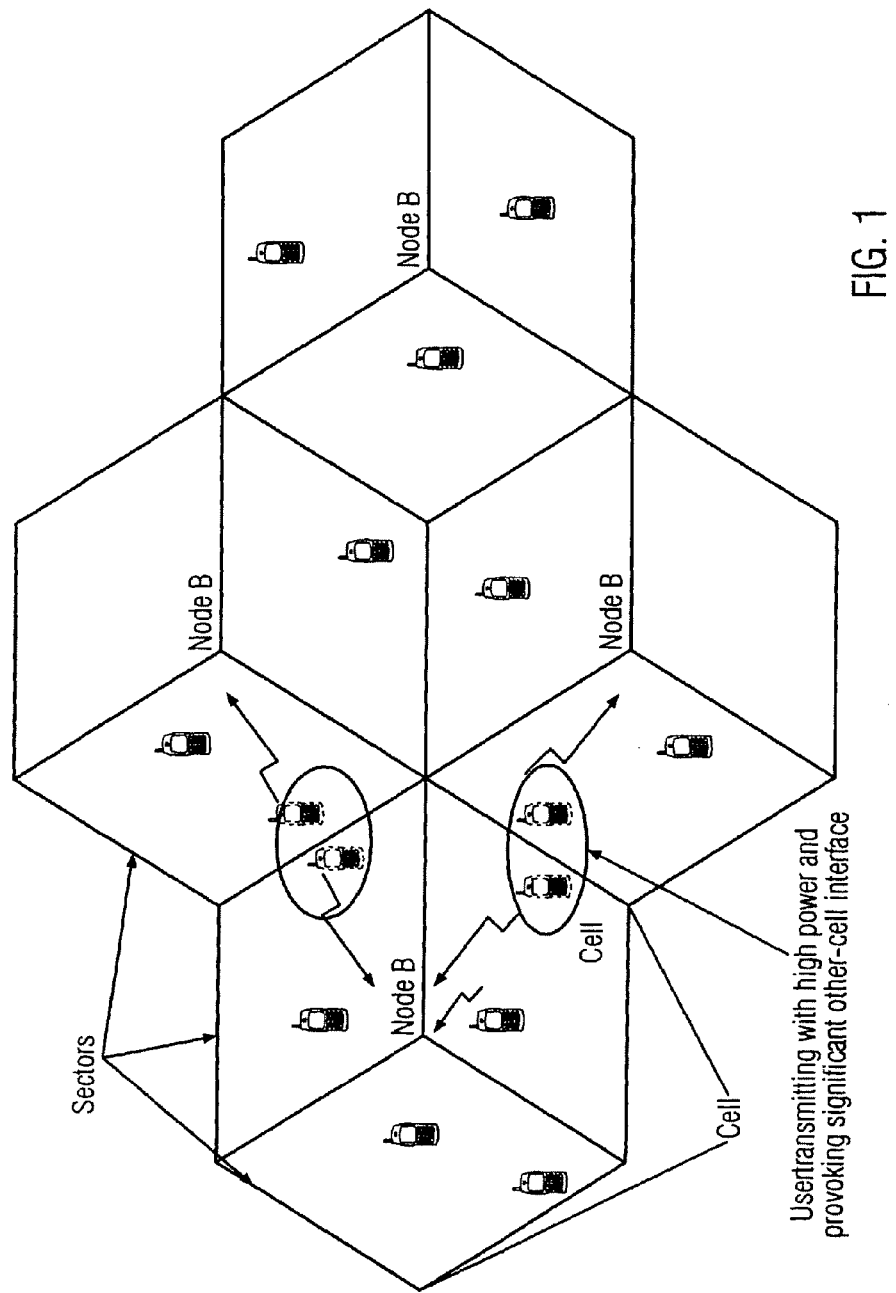
FIG. 1 illustrates a general organization of cells into sectors of a cellular mobile communication system.
Figure 2:
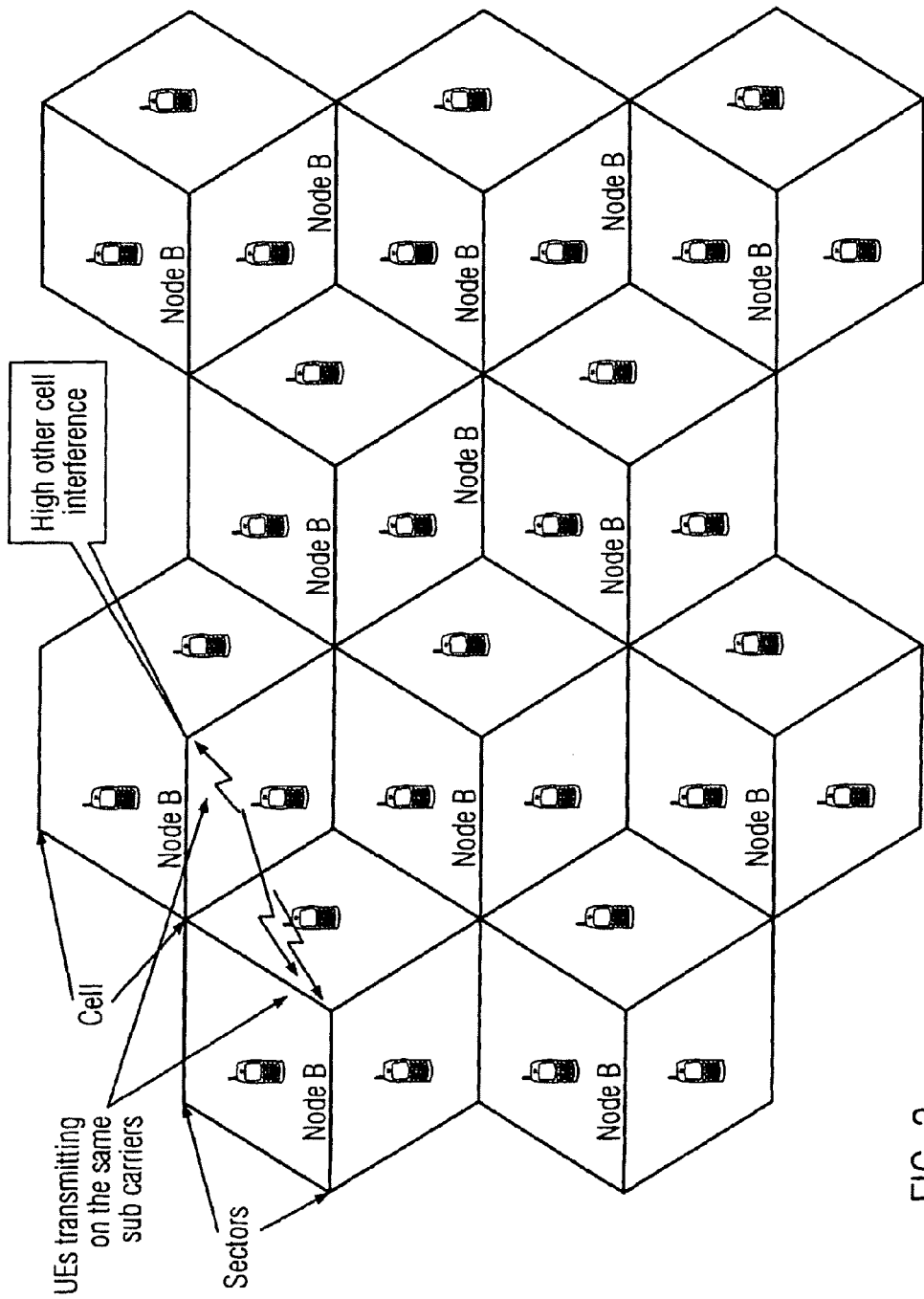
FIG. 2 illustrates neighboring cell interference in a cellular communication system.
Figure 3:
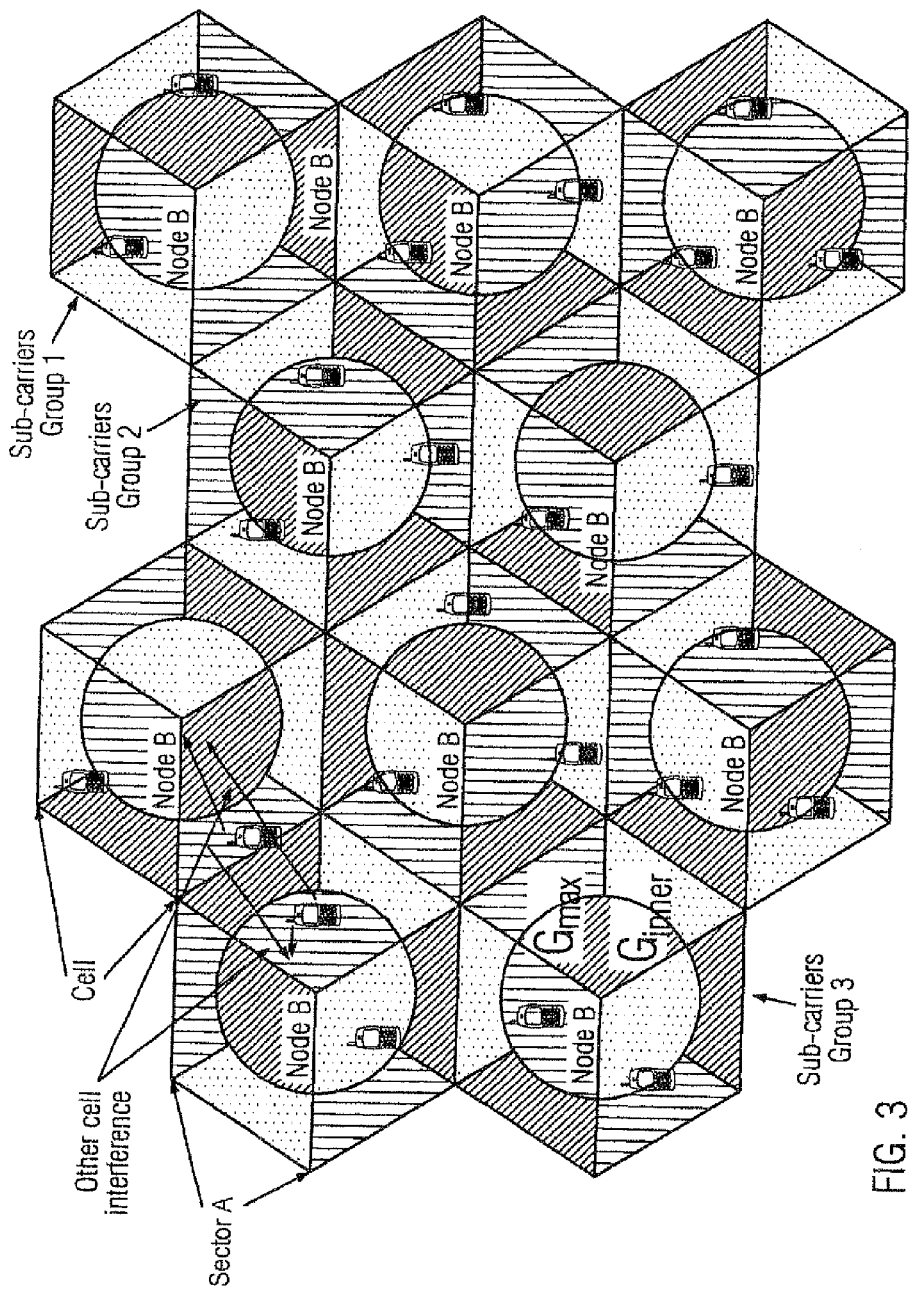
FIG. 3 illustrates a layout of sectors and separation into zones in accordance with the principles of the present invention.

FIG. 3 shows an exemplary embodiment of the invention, wherein each cell is separated into three sectors of essentially equal size and each sector is again separated into three zones. The grey shaded areas of each zone indicate an allocated frequency band within each zone. As shown, the frequency bands allocated to the outer zones are chosen such that the neighbor cell uses a different frequency band in the adjacent outer zone. In case the cell is fully loaded, the frequency bands can be allocated to users in these different zones as shown in the figure. Hence, a neighboring cell interference is minimized. In case the cell is not fully loaded, then the UEs at the inner zone can use all of the frequency bands except for those used by the UEs at the cell edges.

It will be appreciated by those skilled in the art that the sector separation into zones shown in FIG. 3 is only exemplary and that any desired configuration for the inner and outer zones can be chosen, provided that there is at least a separation of the inner zone from the outer zone at the cell edges.

As can be seen in FIG. 3, the size of the inner zone is determined by the value $G_{inner}$ (in dB) given by:

$$G_{inner} = G_{max} - G_{offset}$$

where $G_{max}$ (in dB) is the maximum path loss of the cell and equally of the sector, which is a network planning parameter. In this equation, $G_{offset}$ is an offset value defined in dB. Preferably, $G_{offset}$ is set to values proportional to a value used for handover decisions.

Hence, $G_{offset}$ is a radio resource management (RRM) parameter, which can be updated by the network. In case the handover decision value is updated by the radio resource manager, for instance due to variations of load on the different cells and transmitted to Node Bs, the value of $G_{offset}$ is also updated and notified to the Node Bs. The association of $G_{offset}$ to the value used for handover decisions is independent of the fact of inter-Node B communication that is established for the sake of other cell interference coordination. It is also independent of the frequency according to which signaling messages are exchanged between Node Bs for the same interference coordination.

According to a preferred embodiment, the value $G_{offset}$ is the hysteresis value used for handover decisions, which is a parameter that can be set by the network operator.

It is estimated that the relationship between $G_{offset}$ and the hand over hysteresis value is a implicit mechanism of adapting the zone size according to the offered traffic or load in the system.

The hysteresis value is for example defined in H. Holma, A. Toskala (editors), "WCDMA For UMTS", Wiley Editions, Chistester UK, Third Edition, 2003. It can be seen therein that this value defines the easiness with which an user is performing hand over, i.e. if this hysteresis value is high, then an user needs to receive much higher power from the neighbor cell than from the presently serving one, before he finally hands over to the neighbor cell. Hence, a user needs to go further inside the neighbor cell before he switches to this one. Consequently, the hysteresis value determines the so called "virtual size" of the cell. Briefly, the bigger the hysteresis value is, the bigger the virtual cell size.

As a typical radio resource management parameter, the handover hysteresis value is updated by the radio resource management upon observation of changes in the system load or traffic, or upon observation on the movement of users in the system. As an example, one could imagine a scenario where the operator decides to increase the handover hysteresis value as a means to prevent users from piggybacking at neighbor cells of an area following to some observations on the movement of the users in this area.

As a further example, an SC-FDMA system implements the neighbor cell interference coordination mechanism, which imposes zone separation within a given sector. As a result, at a given time instant, the zone separation and the sub-carrier allocation per zone are as shown in FIG. 3. Imagine that user A in the grey shaded zone of the upper left sector is moving towards the cell that is located on its left. In case the network operator has decided to have a high handover hysteresis value, then this specific user is handing over to this new cell only when its channel conditions are much better than the ones of his current serving cell. Hence, it is very likely that this specific user is handing over at a point very close to the inner grey shaded zone of this cell, or even if he is inside this zone. It can be seen that users at this inner zone of this cell are using the same group of sub-carriers as the moving user is using in his previous cell.

Therefore, it is estimated that the association between the handover hysteresis value and of the $G_{offset}$ is going to improve the performance of neighbor cell interference coordination mechanisms that rely on this zone separation.

In case the interference coordination is done on a semistatic or dynamic basis, then the assumption is that the Node Bs might communicate for the exchange of signaling with other Node Bs. Alternatively, the Node Bs can be connected to an radio resource manager.

Node Bs may collect reference signals from all of the active UEs in its cell and hence in its sectors and within a given time window (in the order of hundreds of milliseconds) UEs transmit reference signals over all the resource blocks (RBs) of the SC-FDMA air interface. This applies for all of the active UEs in the system, independently of them having been granted resources on some RBs or not. With the term active UEs, what is meant here are the UEs having data in their buffers and an established connection to the network. Preferably, UEs that are transmitting data, transmit reference signals on the same frequency bands that they use for the data transmission. Hence, the active UEs should transmit uplink reference signals not only on the frequency bands they use for their data transmission. Additionally, the UEs transmit once every time window uplink reference signals and on the resource blocks that they do not use for their data transmission.

Within an interval equal to the time window size (in the order of hundreds of milliseconds), the Node Bs are able to obtain the average path loss (propagation loss+shadow fading+fast fading) of all of the UEs in their sectors over all of the assigned resource blocks. This information on the average path loss of all UEs within each cell may be transmitted to the Radio Resource (RR) manager.

Once the Node B is informed on the channel quality of the channels of all UEs over all RBs, then it may forward the information that it (the Node B) judges (filters) the necessary for the scheduling related functions of the RR manager. Then, the Node Bs forward this information to the RR manager.

Figure 4:
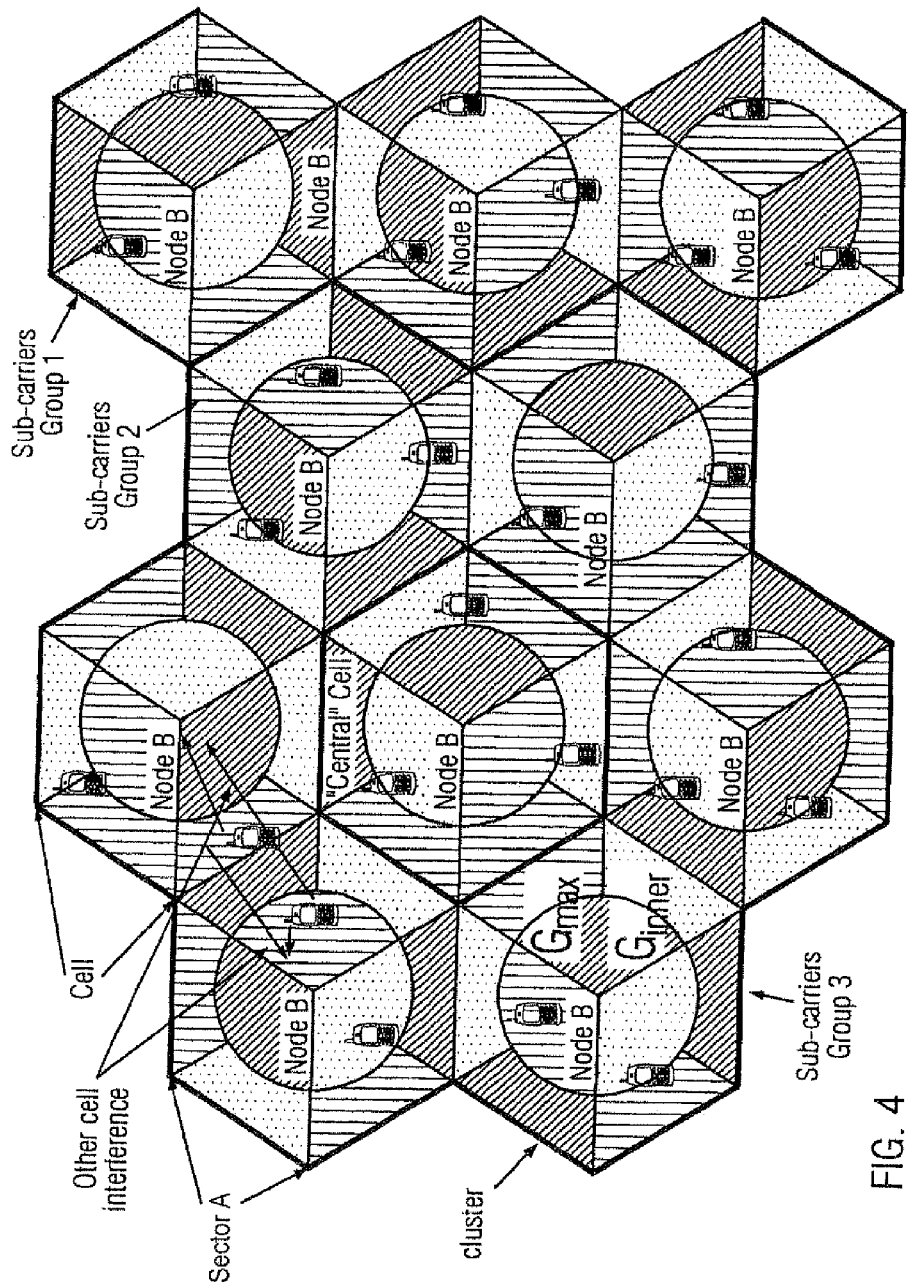
FIG. 4 illustrates a further example of a cell layout in accordance with the principles of a present invention.

FIG. 4 shows an example wherein the RR manager is located within one Node B of the system. A number of Node Bs are clustered and they are controlled by this Node B featuring the RR manager. This Node B is called central Node B. Of course, several other locations of the RR manager may be defined.

On the basis of the received measurements of the adjacent Node Bs, the RR manager (central Node B in the example of FIG. 4) makes the resource block (or group of subcarriers) allocation to the inner and outer zone of each sector within its cell and its adjacent ones. In general, this resource block allocation is valid for a time window and Node Bs can allocate resources dynamically (e.g. even at a sub-frame level) to their users. For the users within a given inner or outer sector zone, the assignment is done among the resource blocks granted from the central Node B for this specific zone. Preferably, the resource block allocation is done in a way that either the system throughput is maximized, or users located at the different sides of the cell borders are not using the same resource blocks.

In addition, adjacent RR managers (or central Node Bs in the example of FIG. 4) exchange signaling messages that contain the resource blocks that are allocated in the outer zones of their neighboring sectors. This information is taken into consideration by the RR manager, when the allocation of resource blocks into zones is done.

Hence, these signaling messages contain measurements from the UEs that the Node Bs pass on to the central Node B. In addition, frequency bands allocations from the central Node B to the Node Bs, as well as information concerning reconfiguration of the zones and the related restrictions are transmitted.

Figure 5:
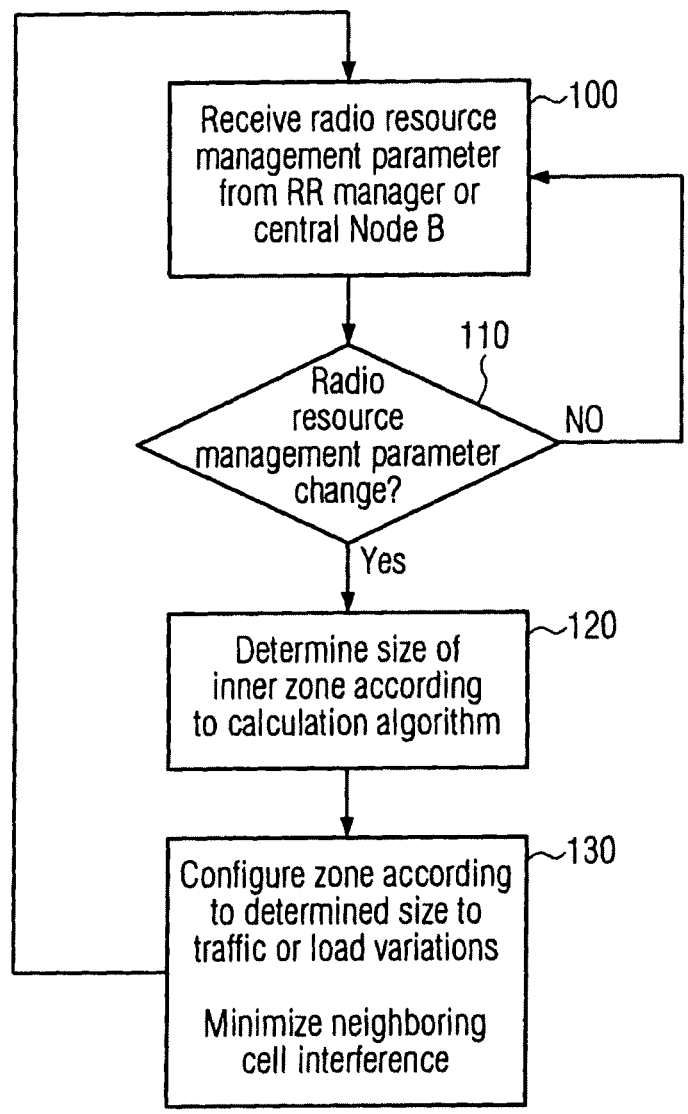
FIG. 5 shows a flow chart illustrating the method of the present invention.

FIG. 5 shows a flowchart of the method steps according to the present invention. In step 100, Node B waits to receive a radio resource management parameter from the RR manager of the network or the central Node B.

Next in step 110, it is monitored whether a radio resource management parameter is changed. If no change is detected, the process loops back to step 100 to receive the next radio resource management parameter. If in step 110 a radio resource management parameter change is detected, the process continues with step 120.

In step 120, the process continues to determine the size of at least one inner zone of the cell according to a predetermined calculation algorithm. As described above, the calculation may take into account a maximum path loss of the cell, which is a network planning parameter and an offset value. Preferably, the offset value is proportional to a value used for a handover decision.

Finally, the process then progresses with reconfiguration of the zones of the cell according to the determined zone size in order to adjust to traffic or load variations and to minimize neighboring cell interference. The process then loops back to step 100 for restarting at an appropriate time.

It will be appreciated by those skilled in the art that the various modifications and alternatives are possible. For instance, the described separation of a cell into three sectors and three zones is to be understood as non-limiting and may exemplarily be any integer number varying from 2 to 16, depending on the number of antennas available for the sector and desired zone sizes.

Further, the radio block resources, which in the above description have been assumed to be time and frequency could be extended to other, such as codes, for example.

The invention claimed is:

1. A base station apparatus of a cellular mobile communication system employing a frequency division multiplex access scheme, the base station apparatus comprising:
a receiving unit, including a processor, configured to receive a radio resource management parameter from a neighboring base station in a neighboring cell,
an allocating unit configured to allocate a frequency band to a user equipment located within the cell of the base station apparatus, wherein
the allocating unit is configured to allocate a different frequency band from a frequency band used at the cell edge of the neighboring cell to the user equipment located at the cell edge of the cell of the base station apparatus based on the received radio resource management relating to information on an interference level in the neighboring cell, the interference level being measured by the neighboring base station.

2. A method to be performed by a base station apparatus of a cellular mobile communication system employing a frequency division multiplex access scheme, said method comprising:
receiving, by a radio receiver, a radio resource management parameter from a neighboring base station in a neighboring cell, the radio resource parameter having been measured by the neighboring base station; and
allocating a frequency band to a user equipment located within the cell of the base station apparatus, wherein
the frequency band is allocated different from a frequency band used at the cell edge of a neighboring cell to the user equipment located at the cell edge of the cell of the base station apparatus based on the received radio resource management parameter relating to information on an interference level in the neighboring cell.

3. The base station apparatus in accordance with claim 1, wherein the interference level is an uplink interference level at the neighboring cell.

4. The base station apparatus in accordance with claim 3, wherein the uplink interference level is determined based on a reference signal transmitted by a user equipment in the neighboring cell.

5. The base station apparatus according to claim 1, wherein the receiving unit is configured to receive information on the interference level experienced by the neighboring cell on all resource blocks, per resource block.

6. The base station apparatus according to claim 1, wherein the base station apparatus is configured to take the information on the interference level into account upon performing scheduling.

7. The method according to claim 2, wherein the interference level is an uplink interference level at the neighboring cell.

8. The method according to claim 7, wherein the uplink interference level is determined based on a reference signal transmitted by a user equipment in the neighboring cell.

9. The method according to claim 2, further comprising receiving information on an interference level experienced by the corresponding cell on all resource blocks, per resource block.

10. The method according to claim 2, further comprising performing a scheduling thereby taking into account the information on the interference level.

* * * * *